(12) United States Patent
Amagata

(10) Patent No.: US 9,905,016 B2
(45) Date of Patent: Feb. 27, 2018

(54) ROBOT IDENTIFICATION SYSTEM

(71) Applicant: FANUC Corporation, Yamanashi (JP)

(72) Inventor: Yasuhiro Amagata, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/937,876

(22) Filed: Nov. 11, 2015

(65) Prior Publication Data

US 2016/0184998 A1 Jun. 30, 2016

(30) Foreign Application Priority Data

Dec. 25, 2014 (JP) ................................ 2014-263537

(51) Int. Cl.
| G06K 9/00 | (2006.01) |
| G06T 7/20 | (2017.01) |
| B25J 9/16 | (2006.01) |
| G06T 7/73 | (2017.01) |

(52) U.S. Cl.
CPC ........... G06T 7/2046 (2013.01); B25J 9/1605 (2013.01); G06T 7/75 (2017.01); Y10S 901/47 (2013.01)

(58) Field of Classification Search
USPC ........... 382/153, 152, 103, 296; 219/121.61; 318/568.1, 587; 356/3.1, 302; 700/245; 701/23; 901/47
See application file for complete search history.

(56) References Cited

U.S. PATENT DOCUMENTS

| 6,845,295 | B2* | 1/2005 | Cheng | G05B 19/4103 219/121.61 |
| 7,769,203 | B2* | 8/2010 | Oohashi | G05D 1/0251 382/103 |
| 8,423,188 | B2* | 4/2013 | Tsusaka | B25J 9/0003 700/250 |
| 8,929,642 | B2* | 1/2015 | Ichimaru | G01B 11/25 356/3.1 |
| 9,258,550 | B1* | 2/2016 | Sieracki | H04N 13/0282 |
| 9,367,770 | B2* | 6/2016 | Footen | G06K 9/78 |
| 9,463,574 | B2* | 10/2016 | Purkayastha | B25J 9/1697 |
| 9,495,788 | B2* | 11/2016 | Kim | G06T 13/40 |
| 2014/0277737 | A1 | 9/2014 | Sekiyama et al. | |

FOREIGN PATENT DOCUMENTS

| DE | 10305384 A1 | 8/2004 |
| JP | 2004-243516 A | 9/2004 |
| JP | 2007-245283 A | 9/2007 |
| JP | 2011-189431 A | 9/2011 |
| JP | 2012-218120 A | 11/2012 |
| JP | 2014-161965 A | 9/2014 |
| JP | 2014-180707 A | 9/2014 |

* cited by examiner

Primary Examiner — Anh H Do
(74) Attorney, Agent, or Firm — Hauptman Ham, LLP

(57) ABSTRACT

A robot identification system includes a robot having a rotatable arm, an imaging unit imaging the robot, an angle detector detecting a rotation angle of the arm, a model generator producing robot models representing the forms of the robot on the basis of the rotation angle detected by the angle detector, and an image identification unit that compares an image captured by the imaging unit with the robot models generated by the model generator to identify a robot image in the image.

4 Claims, 9 Drawing Sheets

ROBOT IDENTIFICATION SYSTEM

RELATED APPLICATIONS

The present application claims priority to Japanese Application Number 2014-263537, filed Dec. 25, 2014, the disclosure of which is hereby incorporated by reference herein in its entirety.

BACKGROUND OF THE INVENTION

1. Field of the Invention

The present invention relates to a robot identification system that identifies a robot image included in an image captured by an imaging unit.

2. Description of Related Art

In recent years, techniques relating to augmented reality in which an image captured by an imaging unit is displayed with the addition of information generated by a computer have become widespread. There is known a device described in Japanese Patent Application Laid-Open No. 2014-180707, by way of example, in which the augmented reality technique is applied to a robot image.

Incidentally, for example, when an imaging unit captures an image in an operating environment having a plurality of robots and information corresponding to each individual robot is added to the image, robot images corresponding to each individual robot have to be identified in the image. However, the robot images are difficult to identify in the image, because the robots change their postures with time.

SUMMARY OF THE INVENTION

According to a first aspect of the present invention, a robot identification system is provided that includes a robot having a rotatable arm; an imaging unit imaging the robot; an angle detector detecting a rotation angle of the arm; a model generator generating robot models representing the forms of the robot on the basis of the rotation angle detected by the angle detector; and an image identification unit comparing an image captured by the imaging unit with the plurality of robot models generated by the model generator and thereby identifying a robot image in the image.

In a second aspect of the present invention, the robot identification system according to the first mode is provided in which:

the model generator generates the plurality of robot models representing the forms of the robot viewed from a plurality of locations on the basis of the rotation angle detected by the angle detector; and the image identification unit compares the image captured by the imaging unit with the plurality of robot models generated by the model generator, to identify the robot image in the image.

In a third aspect of the present invention, the robot identification system according to the first mode or the second mode is provided in which the robot includes a first robot having a rotatable arm and a second robot having a rotatable arm;

the angle detector includes a first angle detector detecting a rotation angle of the arm of the first robot, and a second angle detector detecting a rotation angle of the arm of the second robot;

the model generator generates first robot models representing the forms of the first robot on the basis of the rotation angle of the arm of the first robot detected by the first angle detector, and second robot models representing the forms of the second robot on the basis of the rotation angle of the arm of the second robot detected by the second angle detector; and the image identification unit compares the image captured by the imaging unit with the first robot models and the second robot models generated by the model generator, to identify a first robot image representing the first robot and a second robot image representing the second robot in the image.

In a fourth aspect of the present invention, the robot identification system according to one of the first to third modes, the robot identification system further comprises a position and posture determination unit determining the relative position and posture of the robot relative to the imaging unit on the basis of the robot model corresponding to the robot image identified by the image identification unit.

In a fifth aspect of the present invention, the robot identification system according to one of first to fourth modes, the robot identification system further comprises a model modification unit, when a time point at which the image of the robot was captured by the imaging unit is different from a time point at which the plurality of robot models were produced by the model generator, the model modification unit modifies the plurality of robot models generated by the model generator in accordance with the time difference.

The purposes, features, and advantages of the present invention and other purposes, features, and advantages become more apparent from the detailed description of a typical embodiment of the present invention taken in conjunction with the accompanying drawings.

DETAILED DESCRIPTION OF THE INVENTION

A robot identification system according to an embodiment of the present invention will be described below with reference to FIGS. 1 to 6B. The robot identification system according to an embodiment of the present invention is applied to so-called augmented reality display devices in which an image of real space captured by an imaging unit is displayed with the addition of information generated by a computer. A display device of this type displays an image of a real robot captured at a production site and overlays information about the robot thereon. In this situation, when the production site has a plurality of robots, it is necessary to identify whether or not one or more robot images are present in the captured image, and, if one or more robot images are present, to identify which robot image corresponds to which robot.

In regard to this point, an identification marker may be attached to each robot, and the imaging unit may image the markers to identify the robot images. However, since the robots change their postures with time, the markers possibly may not be imaged depending on their postures. Even if the markers could be imaged, when the imaging unit is distant from the robots, images of the markers are too small to use for identifying the robot images. To address this problem, the number of the imaging units may be increased, which results in an increase in cost. Attaching markers to each robot also results in a cost increase. Therefore, the robot identification system according to this embodiment is structured as follows.

Figure 1:
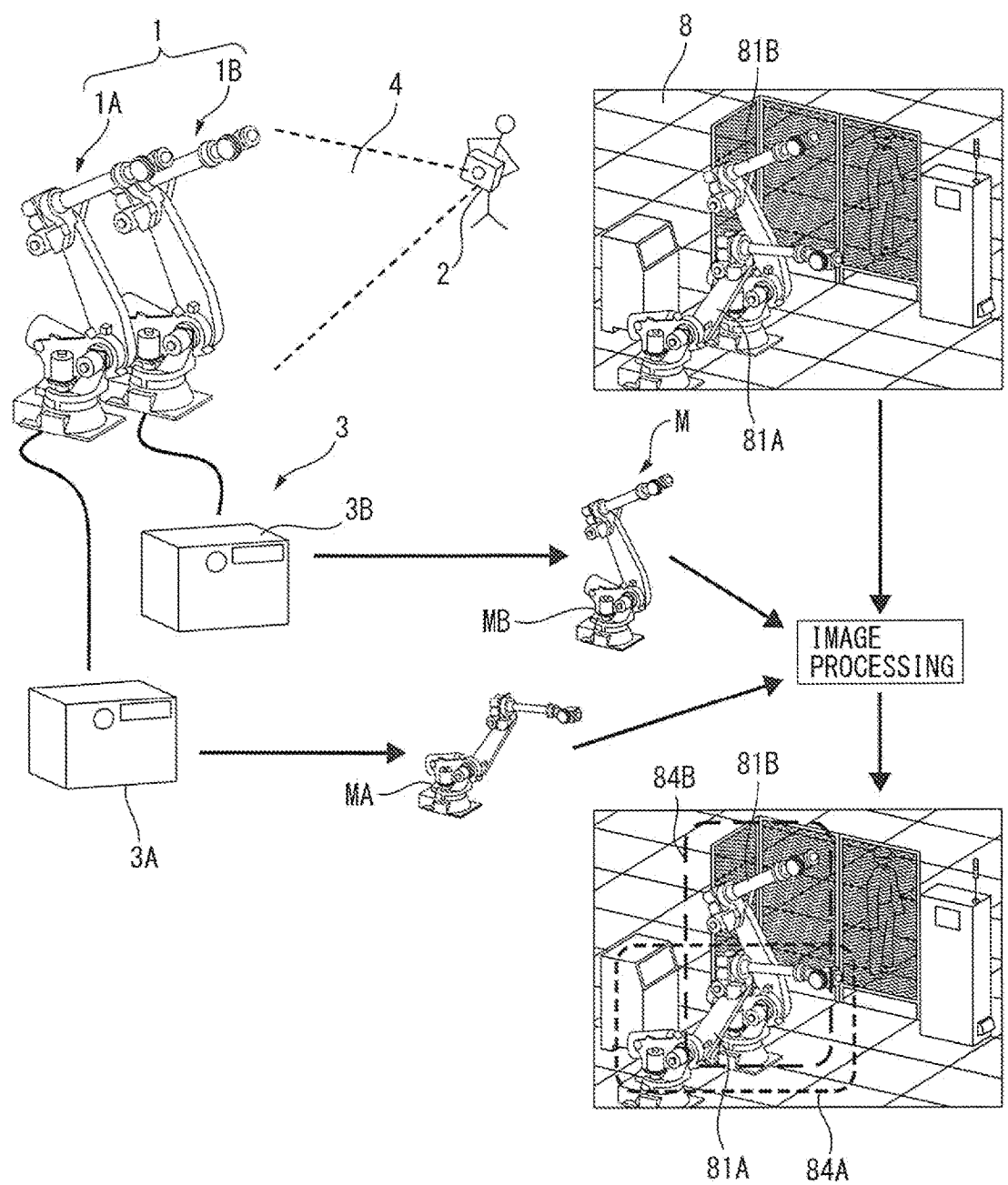
FIG. 1 is a drawing showing the schematic structure of a robot identification system according to an embodiment of the present invention.

FIG. 1 schematically shows the structure of the robot identification system according to an embodiment of the present invention. The robot identification system has robots 1, a camera 2 for imaging the robots 1, and robot controllers 3 for controlling the robots 1. The robots 1 include a first robot 1A and a second robot 1B located next to each other. The robot controllers 3 include a first robot controller 3A for controlling the first robot 1A and a second robot controller 3B for controlling the second robot 1B. The first robot 1A and the second robot 1B are identical to each other, and the first robot controller 3A and the second robot controller 3B are identical to each other in structure. It is noted that the structure thereof may be different from each other.

Figure 2:
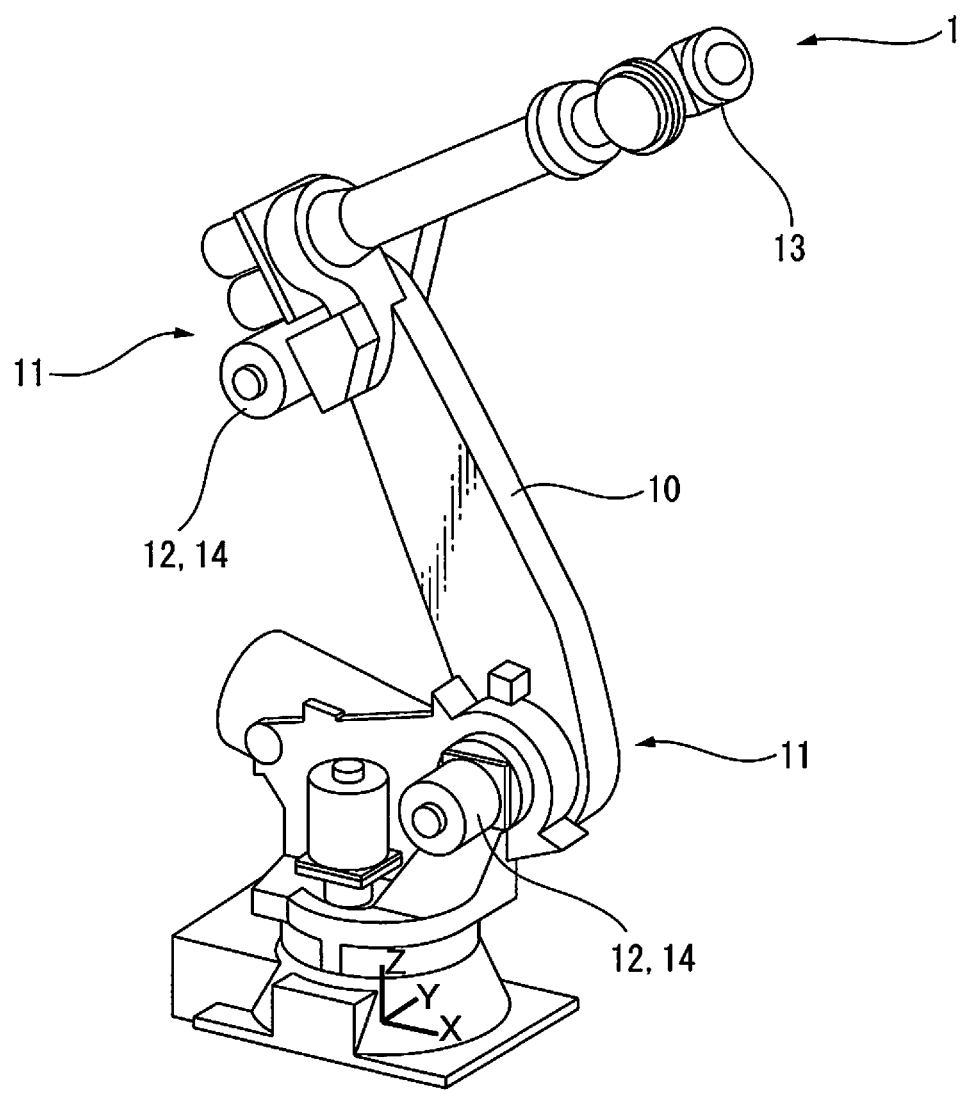
FIG. 2 is a perspective view of the structure of a robot that constitutes the robot identification system of FIG. 1.

FIG. 2 is the perspective view showing the structure of the robot 1. As shown in FIG. 2, the robot 1, being a vertical articulated robot, has an arm 10 pivotable about joints 11 and a tool 13 attached to an end of the arm 10. The joints 11 are each provided with a servomotor 12 to pivot the arm 10 by the operation thereof. The joints 11 are each provided with an angle detector 14 to detect a rotation angle (arm angle) of the arm 10 with respect to a reference position. The angle detector 14 may be, for example, a rotary encoder contained in the servomotor 12. The angle detector 14 provided in the first robot 1A is referred to as a first angle detector, while the angle detector 14 provided in the second robot 1B is referred to as a second angle detector.

The camera 2, which is, for example, an electronic camera having an image sensor such as a CCD, is a well-known light-receiving device having the function of detecting a two-dimensional image on an imaging surface (on a surface of a CCD array). The camera 2 is held by a user, and captures images of the robots 1 in an imaging area 4 from an arbitrary position, to obtain a moving image (camera image) of the imaging area 4. An image signal corresponding to the camera image obtained by the camera 2 is outputted to an image processor 5 (see FIG. 3).

The robot controller 3 outputs a control signal to the servomotors 12 in accordance with a predetermined operation program to operate the robot 1. The control signal may be outputted manually to the servomotors 12 via a not-shown teaching pendant. Signals from the angle detectors 14 are inputted to the robot controller 3.

Figure 3:
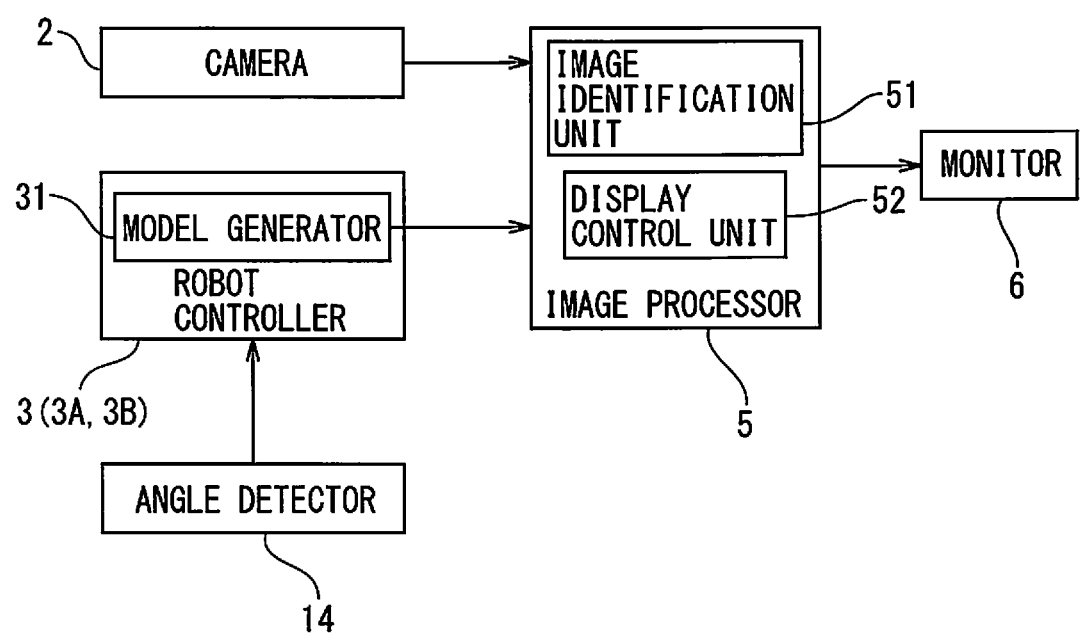
FIG. 3 is a block diagram of the control structure of the robot identification system according to an embodiment of the present invention.

FIG. 3 is the block diagram showing the control structure of the robot identification system according to an embodiment of the present invention. As shown in FIG. 3, each robot controller 3 (3A or 3B) includes a model generator 31 for generating robot models corresponding to the robot 1A or 1B. The image processor 5 includes a computer that consists of an arithmetic processing unit having a CPU, a ROM, a RAM, other peripheral circuits, and the like. The model generator 31, the camera 2, and a monitor 6 are connected to the image processor 5. The image processor 5 includes an image identification unit 51 for identifying a robot image in the camera image, and a display controller 52 for controlling the monitor 6. The image processor 5 performs the following process on the basis of input signals from the model generator 31 and the camera 2, and outputs a control signal to display a designated image on the monitor 6.

A memory of the robot controller 3 stores in advance model information (information about the length and width of each arm, the positions of the joints, and the like) about each of the robots 1A and 1B that is required for producing a three-dimensional robot model. The model generator 31 determines the posture of each of the robots 1A and 1B on the basis of the model information and the arm angle detected by the angle detectors 14. Then, as shown in FIG. 1, the model generator 31 generates first robot models MA corresponding to the posture of the first robot 1A, and second robot models MB corresponding to the posture of the second robot 1B. More specifically, the model generator 31 projects the three-dimensional robot model onto planes in predetermined directions, to generate a plurality of two-dimensional robot models M (the plurality of first robot models MA and the plurality of second robot models MB) that represent the forms of the robot 1 in the same posture when viewed from a plurality of locations in three-dimensional space.

Figure 4:
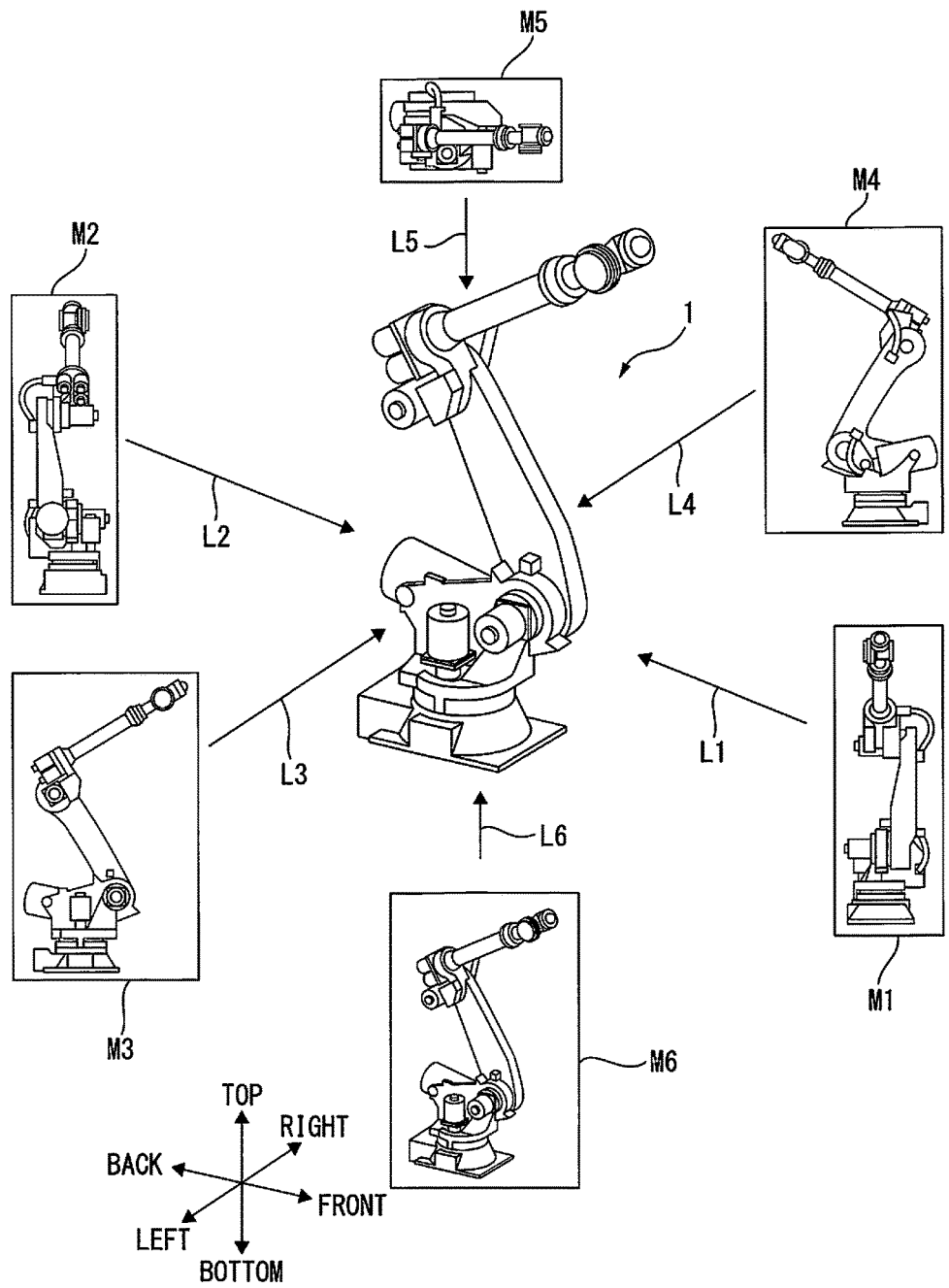
FIG. 4 is a drawing showing an example of robot models generated by a model generator of FIG. 3.

FIG. 4 shows an example of the robot models M. As shown in FIG. 4, anterior and posterior directions, left and right lateral directions, and superior and inferior directions are defined. The model generator 31 generates a front robot model M1 representing the form of the robot 1 viewed from the front, a back robot model M2 representing the form of the robot 1 viewed from the back, a left robot model M3 representing the form of the robot 1 viewed from the left, a right robot model M4 representing the form of the robot 1 viewed from the right, a top robot model M5 representing the form of the robot 1 viewed from the top, and a bottom robot model M6 representing the form of the robot 1 viewed from the bottom.

A plurality of each of the robot models M1 to M6 are produced in accordance with a distance from the camera 2 to the robot 1, though they are not shown in the drawing. For example, when producing the front robot model M1, the model generator 31 sets a first location, a second location, a third location, and the like in front of the robot 1 at established intervals, and generates the plurality of front robot models M1 that correspond to the camera images on the assumption that the robot 1 would be imaged from each location. That is to say, the model generator 31 generates the plurality of robot models M when viewing the robot 1 from locations of different directions and different distances. At this time, the shorter the distance from the robot 1, the larger the robot model M.

The above robot models M1 to M6 are generated at, for example, predetermined time intervals in accordance with the posture of the robot 1. In other words, dynamic robot models M1 to M6 are generated and stored in the memory of the robot controller 3. The robot models M1 to M6 stored in the memory are updated at predetermined time intervals.

Figure 5:
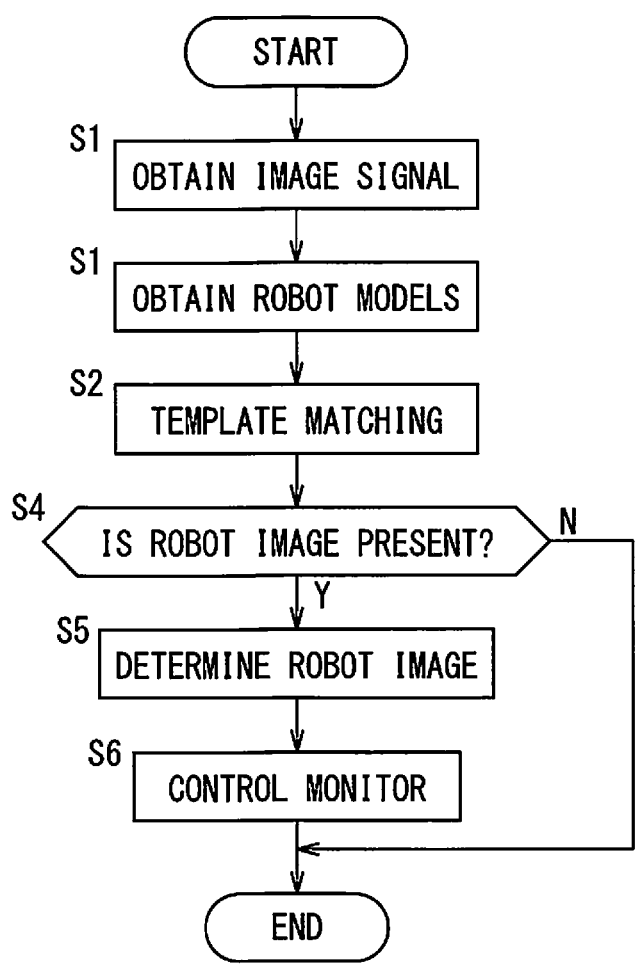
FIG. 5 is a flowchart showing an example of a process performed by an image processor of FIG. 3.

FIG. 5 is a flowchart showing an example of a process performed by the image processor 5. The process shown in the flowchart is started as soon as the camera 2 starts imaging in the state of powering the robot controller 3, for example.

Figure 6A:
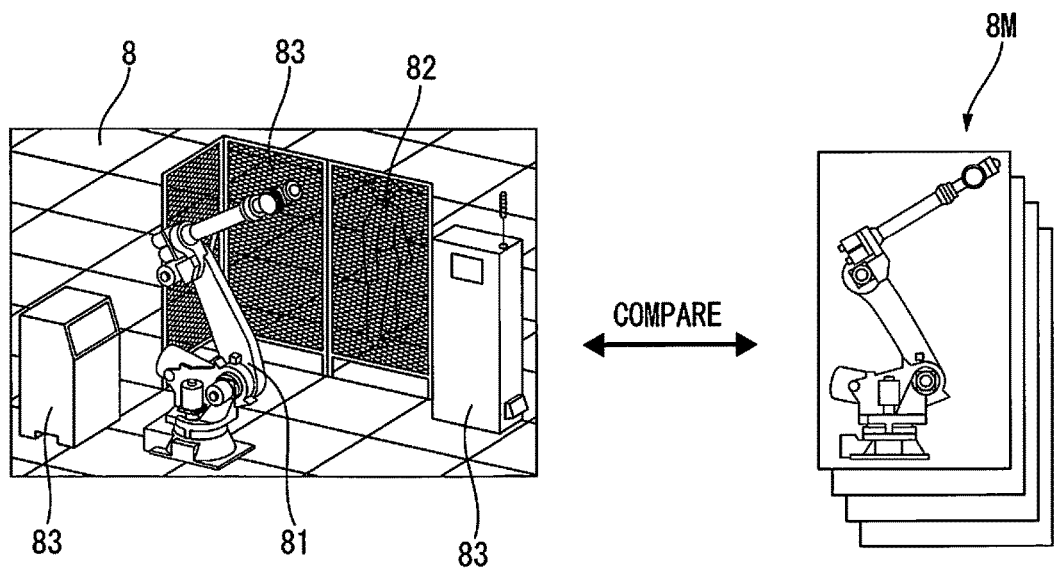
FIG. 6A is a drawing showing an example of a camera image captured by a camera of FIG. 3.

At step S1, an image signal is obtained from the camera 2. FIG. 6A shows an example of a camera image 8 based on the obtained image signal. This camera image 8 includes images of the robot 1, a person, and obstacles (the robot controller and the like) other than the robot 1 and the person (a robot image 81, a person image 82, and obstacle images 83). It is noted that the single robot 1, instead of the plurality of robots, is seen in the camera image 8 of FIG. 6A, as distinct from FIG. 1.

At step S2, a plurality of robot models M are obtained from the robot controller 3. More specifically, the plurality of robot models M that represent the forms of the robot 1 viewed from a plurality of locations (a plurality of directions and positions) are obtained. The obtained robot models M are stored in the memory as template images 8M, as shown in FIG. 6A.

At step S3, the template images 8M are compared with the camera image 8 obtained at step S1. In other words, template matching is performed between each individual template image 8M and the camera image 8.

Figure 6B:
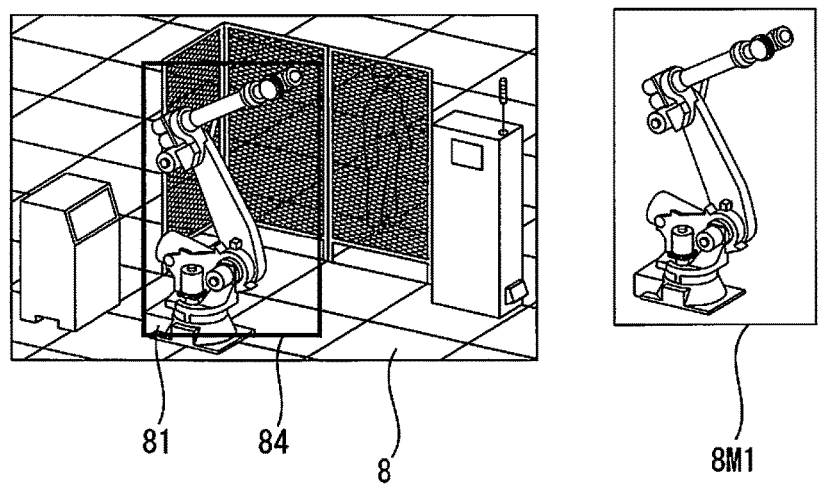
FIG. 6B is a drawing showing a template image that coincides with the camera image of FIG. 6A.

At step S4, whether or not the template image 8M that matches the camera image 8 is present as a result of the template matching is determined, that is, the presence or absence of a robot image 81. FIG. 6B shows the template image 8M1 that matches the camera image 8. If the determination at step S4 is positive, the process proceeds to step S5. On the other hand, if the determination at step S4 is negative, it is determined that the robot image 81 is not present in the camera image 8 and the process ends.

At step S5, a part of the camera image 8 that matches the template image 8M1 is determined to be the robot image 81, so that the robot image 81 is narrowed down in the camera image 8. In FIG. 6B, a rectangular frame 84 indicates an area containing the robot image 81. The robot image 81 can be identified in the camera image 8 by the method described above.

At step S6, a control signal is outputted to the monitor 6 to control an image to be displayed on the monitor 6. For example, the monitor 6 is controlled so as to display the camera image 8 with the addition of predetermined information corresponding to the robot image 81. Then, the image processor 5 ends the process. The above process is repeated at predetermined time intervals.

In a case where a plurality of (two) robot images 81 (a first robot image 81A and a second robot image 81B) are present in the camera image 8, as shown in FIG. 1, it is determined at step S4 that there are two template images 8M1 matching the camera image 8, that is, a first template image 8M1 out of the first robot models MA and a second template image 8M1 out of the second robot models MB.

In this case, in step S5, a part of the camera image 8 that matches the first template image 8M1 is determined to be a first robot image 81A and a part of the camera image 8 that matches the second template image 8M1 is determined to be a second robot image 81B, so that the first robot image 81A and the second robot image 81B are narrowed down in the camera image 8. In FIG. 1, rectangular frames 84A and 84B indicate areas containing the first robot image 81A and the second robot image 81B determined at step S5, respectively.

The embodiment has the following effects.

(1) The robot identification system includes the model generator 31 for generating the plurality of robot models M that represent the forms of the robot 1 viewed from the plurality of locations on the basis of the rotation angle detected by the angle detectors 14, and the image identification unit 51 that compares the camera image 8 obtained by the camera 2 with the plurality of robot models M (template images 8M) generated by the model generator 31 to identify the robot image 81 in the camera image 8. Thus, the robot image 81 can be easily identified out of the camera image 8, irrespective of a change in the posture of the robot 1, and the so-called augmented reality in which information is added to the robot image 81 by using the computer is preferably applicable. Also, eliminating the need for providing a plurality of cameras 2 and attaching an identification marker to each robot 1 results in a reduction in cost of the entire robot identification system.

(2) In a case where the plurality of robots 1A and 1B are included in the imaging area 4 of the camera 2, the model generator 31 of the first robot controller 3A generates the plurality of first robot models MA that represent the forms of the first robot 1A viewed from the plurality of locations on the basis of the arm angle detected by the first angle detectors 14, while the model generator 31 of the second robot controller 3B generates the plurality of second robot models MB that represent the forms of the second robot 1B viewed from the plurality of locations on the basis of the arm angle detected by the second angle detectors 14. Furthermore, the image identification unit 51 compares the camera image 8 with the plurality of first robot models MA and the plurality of second robot models MB, to identify the first robot image 81A and the second robot image 81B in the camera image 8. Therefore, even if the plurality of robot images 81 are present in the camera image 8, each of the robot images 81A and 81B can be easily identified.

(3) The model generator 31 generates the plurality of robot models M of various sizes in accordance with the distance from the robot 1. Since a part or the whole of robot 1 is modeled into the robot models M, the robot image 81 can be easily identified irrespective of the size of the robot image 81 in the camera image 8.

Modification Examples

Figure 7:
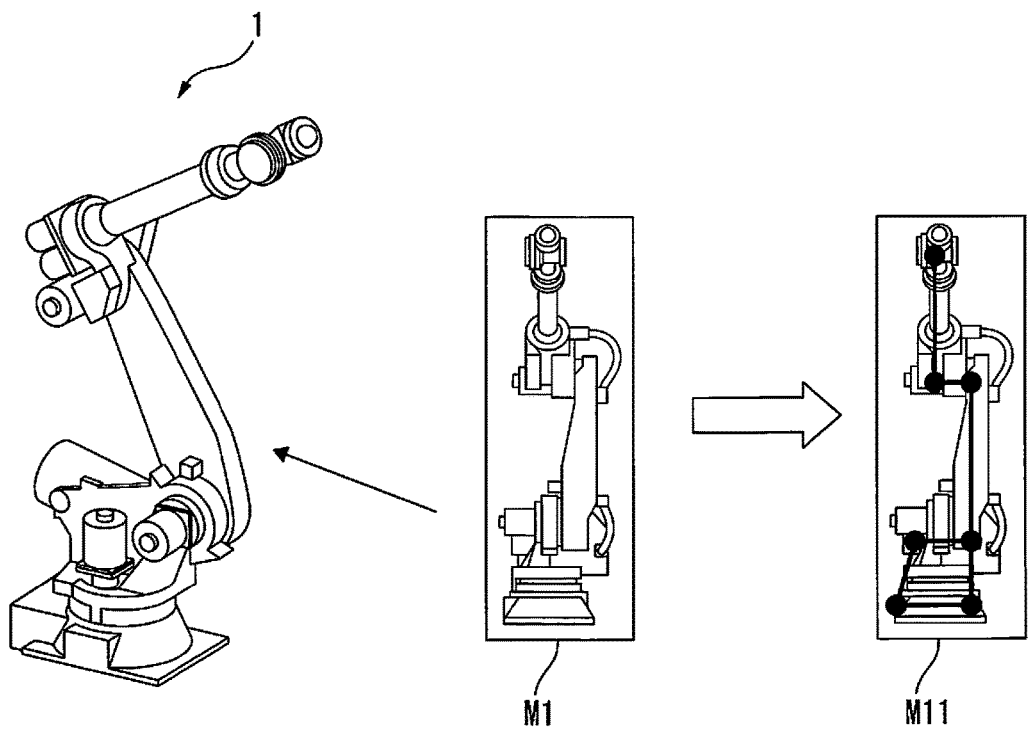
FIG. 7 is a drawing of a modification example of the robot model.

The above embodiment can be modified as follows. The robot models M are not limited to those shown in FIG. 4. In other words, the form of the robot 1 is not necessarily modeled into the robot model M in detail, as long as the robot model M is usable for identifying the robot 1. FIG. 7 shows a modification example of the robot model M. In FIG. 7, characteristic points (joints and the like) are extracted from the robot model M1 in which the robot 1 is viewed from the front. Connecting the characteristic points with sticks forms a simple robot model M11. In this case, by performing pattern matching between the camera image 8 and the robot model M11, whether or not an image having the characteristic points of the robot model M11 is present in the camera image 8 is determined to identify the robot image 81 out of the camera image 8. There are various methods for extracting the characteristic points, such as a method using the Harris operator.

Figure 8:
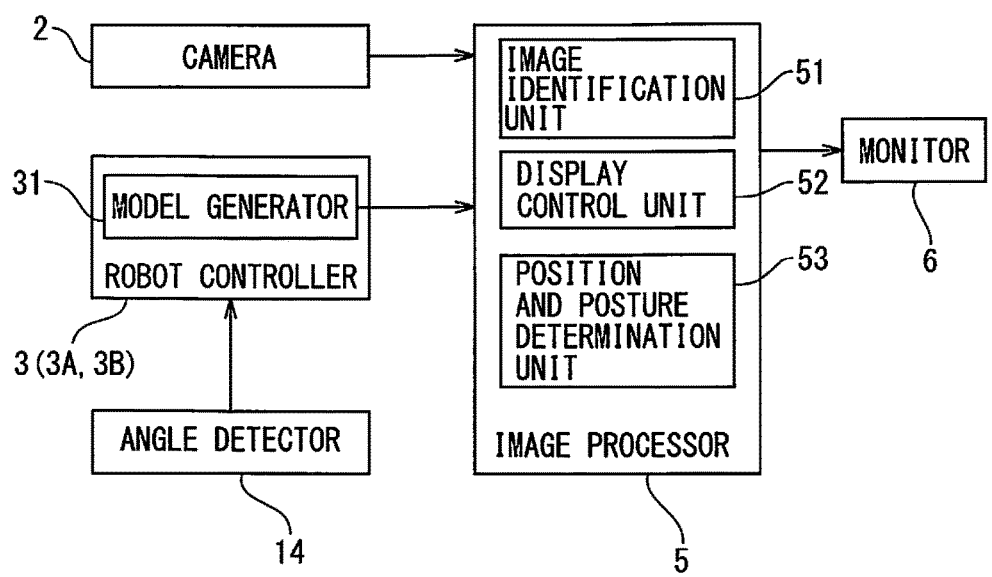
FIG. 8 is a block diagram of a modification example of FIG. 3.
Figure 9:
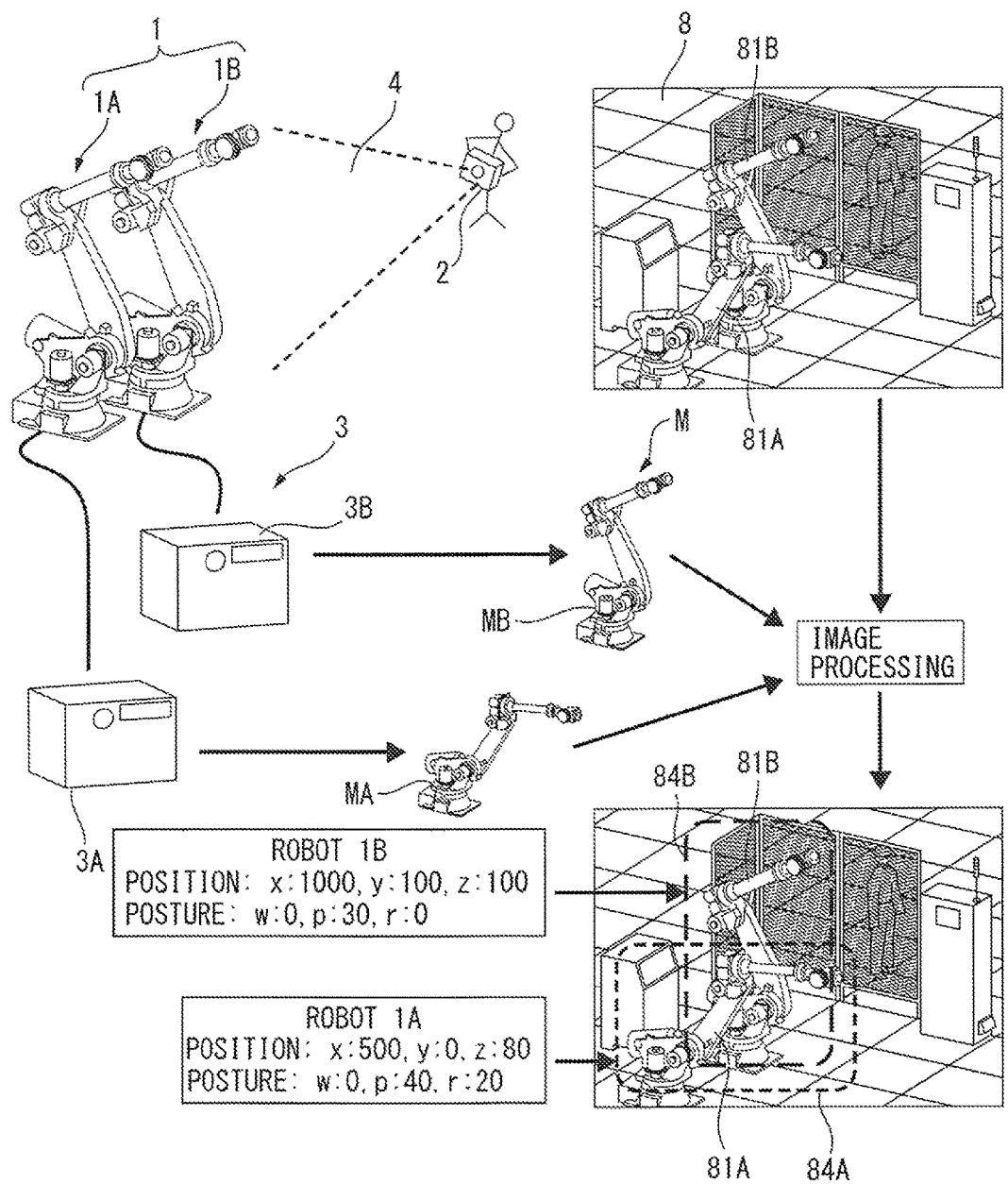
FIG. 9 is a drawing of a modification example of FIG. 1.

FIG. 8 is the block diagram of a modification example of FIG. 3. The image processor 5 shown in FIG. 8 has a position and posture determination unit 53 for determining the relative position and posture of the robot 1 relative to the camera 2, in addition to the image identification unit 51 and the display control unit 52. When the image identification unit 51 determines that the robot image 81 is present in the camera image 8 (step S4 in FIG. 5), the position and posture determination unit 53 refers to the template image 8M of the robot model M corresponding to the robot image 81. Then, the position and posture determination unit 53 determines which direction and which location the robot model M that corresponds to the template image 8M is viewed from. Thereby, as shown in FIG. 9, it is possible to determine the relative position and posture of each of the robots 1A and 1B relative to the camera 2.

Figure 10:
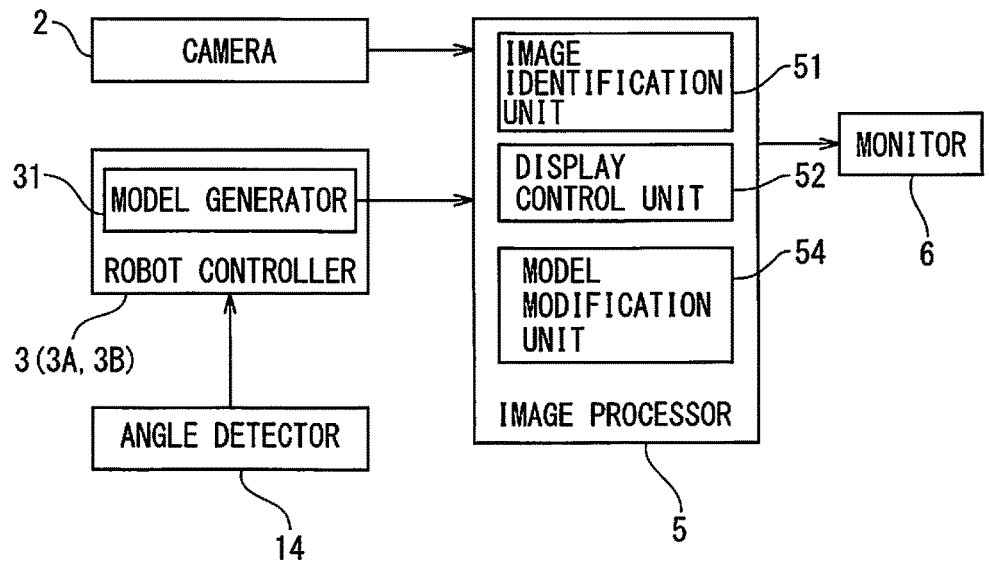
FIG. 10 is a block diagram of another modification example of FIG. 3.

FIG. 10 is the block diagram of another modification example of FIG. 3. Provided that the camera 2 captures the image of the robot 1 at a first time point and the model generator 31 generates robot models M using the arm angle of the robot 1 at a second time point, in which the first time point is different from the second time point, if the posture of the robot 1 changes between the first time point and the second time point, template matching is not likely to be performed in an appropriate manner between the camera image 8 and the template images 8M. The block diagram of FIG. 10 has been made in consideration of this problem. The image processor 5 shown in FIG. 10 has a model modification unit 54, in addition to the image identification unit 51 and the display control unit 52. The image processor 5 may further have the position and posture determination unit 53 (see FIG. 8).

Figure 11:
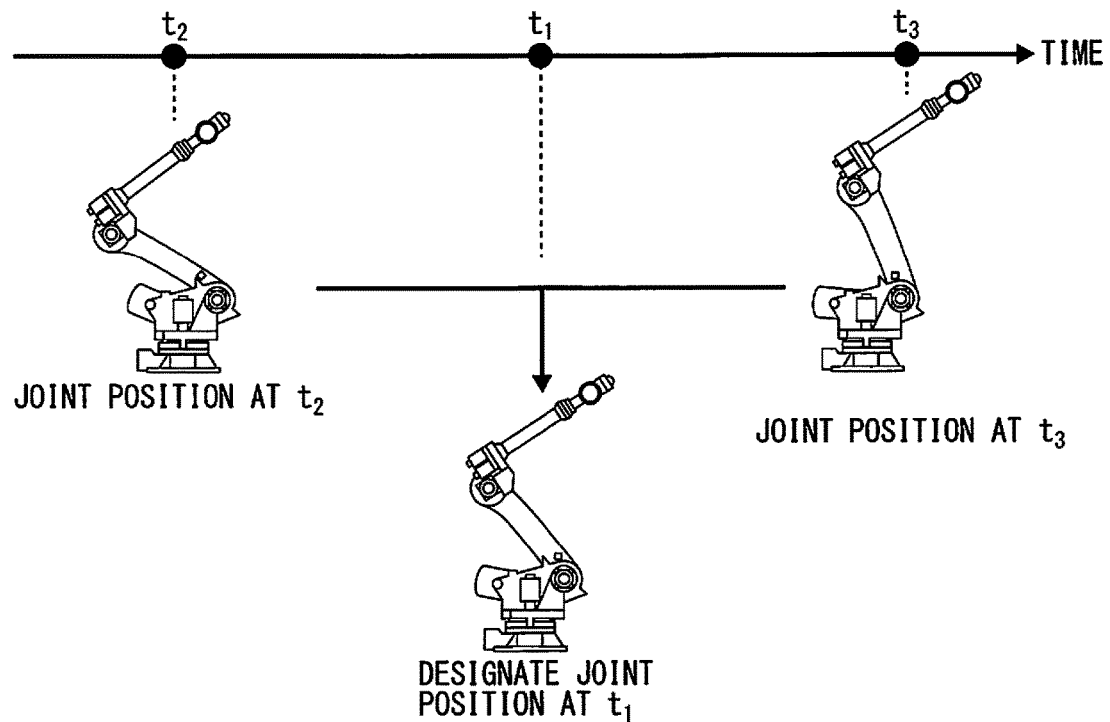
FIG. 11 is a drawing that explains a method for producing the robot models, in a case where a time point at which the image was captured by the camera is different from time points at which the robot models were produced.

The robot controller 3 and the camera 2 each have a timer, the time of which is synchronized with each other. In a case where the first time point at which the image was captured by the camera 2 is different from the second time points at which the robot models M were generated, as shown in FIG. 11, the joint position of the robot 1 are obtained at two time points t2 and t3 before and after the first time point t1. Based on the joint position at the different two time points t2 and t3, the joint position of the robot 1 at the first time point t1 is calculated from, for example, the following expression (I).

Joint position at time point $t1=(t1-t2)/(t3-t2)\times$(joint position at time point $t3$)+$(t3-t1)/(t3-t2)\times$(joint position at time point $t2$)     (I)

Moreover, the robot models M are generated by using the calculated joint position. Thus, robot models M that are generated by the model generator 31 at the time points t2 and t3 are modified into robot models M at the same time point as the time point t1 of imaging by the camera 2. The image identification unit 51 performs template matching between the camera image 8 and the robot models M modified by the model modification unit 54. Otherwise, the image identification unit 51 calculates characteristic points of the robot models M, and performs pattern matching between the camera image 8 and the characteristic points. Thereby, in a case where the first time point at which the image was captured by the camera 2 is different from the second time points at which the robot models M were produced by the model generator 31, the pattern matching can be properly performed, thus reliably identifying the robot image 81 out of the camera image 8.

It is noted that, the joint position of the robot 1 at the first time point t1 is calculated by linear interpolation in the above expression (I), but may be estimated by using various interpolation methods such as spline interpolation. The joint position at the first time point t1 is estimated by using the joint position of the robot 1 at the two time points t2 and t3 before and after the first time point t1, but both of the two time points t2 and t3 may be before the first time point t1 or after the first time point t1.

In the above embodiment, the single camera 2 captures the images of the robot 1, but the structure of the imaging unit is not limited thereto. For example, the imaging unit may be composed of a stereo camera having a pair of imaging lenses. Thus, as the image to be compared with the robot models M, various images are usable such as a range (depth) image and a stereoscopic image, as well as a two-dimensional color image. In the case of using the range image, the range image is compared with the three-dimensional robot model by using, for example, a well-known method called an ICP algorithm, to identify the robot image in the image. In the case of using the stereoscopic image, the stereoscopic image is compared with the three-dimensional robot model to identify the robot image in the image. Otherwise, the stereoscopic image may be converted into the range image, and the method using the ICP algorithm may be adopted thereto.

As described above, the present invention includes the case of identifying the robot image by comparing the image with the three-dimensional robot model, as well as the case of identifying the robot image by comparing the image with the two-dimensional robot models. Thus, the model generator may have any structure as long as the model generator generates a robot model that represents the form of the robot on the basis of the rotation angle detected by the angle detectors. The image identification unit may have any structure as long as the image identification unit identifies the robot image in the image by comparing the image captured by the imaging unit with the robot model generated by the model generator. The imaging unit may be mounted on a stand or the like, instead of being held by the user. The angle detector for detecting the rotation angle of the arm 10 may take various structures, instead of the angle detectors 14 described above.

The model generator 31 generates the robot models M on the basis of the rotation angle of the arm 10 in the above embodiment, but may generate the robot models M in further consideration of information about the three-dimensional form and the attachment position of the tool 13 attached to the end of the arm 10, the color information of the robot 1, and the like. Thereby, it is possible to generate the models of each individual robot 1 by differentiating between the robots 1. The model generator 31 is provided in the robot controller 3 in the above embodiment, but may be provided in the image processor 5 or another device instead.

The image identification unit 51 is provided in the image processor 5 in the above embodiment, but may be provided in the robot controller 3 or another device instead. The camera image 8 is compared with the template images 8M by the template matching in the above embodiment. However, since a method for image processing differs depending on the type of captured image, a method other than the template matching may be used instead. The structure of the robot 1 having the rotatable arm 10 is not limited to the above. The present invention is applicable to the case of providing three or more robots 1 in the imaging area 4.

Advantageous Effect of the Invention

The robot identification system according to the present invention compares the image captured by the imaging unit with the robot models, to identify the robot image in the image. Thus, it is possible to easily identify the robot image in the image irrespective of the posture of the robot.

The above description is just an example, and the present invention is not limited to the above embodiment and modification examples as long as the features of the present invention are not impaired. The components of the above embodiment and modification examples include those replaceable or apparently replaceable while maintaining the identity of the invention. That is, other embodiments that are conceivable within the scope of technical ideas of the present invention are also included in the scope of the invention. The above embodiment can be combined with one or more of the modification examples in an arbitrary manner.

What is claimed is:

1. A robot identification system, comprising:
a robot having a rotatable arm;
a camera imaging the robot;
an angle detector detecting a rotation angle of the arm;
a model generator that generates a robot model representing a form of the robot on the basis of the rotation angle detected by the angle detector; and
an image processor comparing an image captured by the camera with the robot model generated by the model generator and thereby identifying a robot image representing the robot in the image captured by the camera, wherein
the robot includes
   a first robot having a first rotatable arm, and
   a second robot having a second rotatable arm,
the angle detector includes
   a first angle detector detecting a first rotation angle of the first rotatable arm of the first robot, and
   a second angle detector detecting a second rotation angle of the second rotatable arm of the second robot,
the model generator generates
   a first robot model representing the form of the first robot on the basis of the first rotation angle detected by the first angle detector, and
   a second robot model representing the form of the second robot on the basis of the second rotation angle detected by the second angle detector, and
the image processor compares the image captured by the camera with the first robot model and the second robot model generated by the model generator, to identify a first robot image representing the first robot and a second robot image representing the second robot in the image captured by the camera.

2. A robot identification system, comprising:
a robot having a rotatable arm;
a camera imaging the robot;
an angle detector detecting a rotation angle of the arm;
a model generator that generates a robot model representing a form of the robot on the basis of the rotation angle detected by the angle detector; and
an image processor comparing an image captured by the camera with the robot model generated by the model generator and thereby identifying a robot image representing the robot in the image captured by the camera, wherein
the image processor determines a relative position and posture of the robot relative to the camera on the basis of the robot model corresponding to the robot image identified by the image processor.

3. A robot identification system, comprising:
a robot having a rotatable arm;
a camera imaging the robot;
an angle detector detecting a rotation angle of the arm;
a model generator that generates a robot model representing a form of the robot on the basis of the rotation angle detected by the angle detector; and
an image processor comparing an image captured by the camera with the robot model generated by the model generator and thereby identifying a robot image representing the robot in the image captured by the camera, wherein
the model generator generates a plurality of robot models representing a plurality of forms of the robot as viewed from a plurality of locations on the basis of the rotation angle detected by the angle detector; and
the image processor compares the image captured by the camera with the plurality of robot models generated by the model generator, to identify the robot image in the image captured by the camera.

4. A robot identification system, comprising:
a robot having a rotatable arm;
a camera imaging the robot;
an angle detector detecting a rotation angle of the arm;
a model generator that generates a robot model representing a form of the robot on the basis of the rotation angle detected by the angle detector; and
an image processor comparing an image captured by the camera with the robot model generated by the model generator and thereby identifying a robot image representing the robot in the image captured by the camera, wherein
when a first time point at which the image was captured by the camera is different from a second time point at which the robot model was generated by the model generator, the image processor modifies the robot model generated by the model generator in accordance with a time difference between the first time point and the second time point.

* * * * *